United States Patent Office 2,698,343
Patented Dec. 28, 1954

2,698,343

VAPOR PHASE PROCESS FOR THE PRODUCTION OF DIMETHYLCARBAMYL CHLORIDE FROM PHOSGENE AND TRIMETHYL AMINE

Eberhard Stein and Otto Bayer, Leverkusen, Germany, assignors to Farbenfabriken Bayer Aktiengesellschaft, Leverkusen, Germany, a corporation of Germany No Drawing. Application November 4, 1952, Serial No. 318,726

Claims priority, application Germany November 16, 1951

4 Claims. (Cl. 260—544)

This invention relates to the production of dimethylcarbamyl chloride and is more particularly concerned with an improvement in the manufacture of dimethylcarbamyl chloride from phosgene and trimethylamine.

It is already known to prepare dimethylcarbamyl chloride by reacting phosgene with trimethylamine in the liquid phase in an inert solvent.

This known method gives poor yields. In addition, the efficiency of this method drops in the coarse of operation and may be entirely stopped by the plugging of the trimethylamine conduit by crystals of dimethylcarbamyl chloride at a point near the reactor.

It is, therefore, an object of the present invention to provide a new and improved method of producing dimethylcarbamyl chloride which obviates the disadvantages inherent in the liquid phase procedure. A further object is to provide a process for the manufacture of dimethylcarbamyl chloride which is suited for large scale production.

The above and other objects are attained in accordance with the present invention by reacting phosgene and trimethylamine in the gaseous phase. We have found that, when the reaction is carried out in this manner, high yields of dimethylcarbamyl chloride are obtained.

The process of the invention may be effected under a wide variety of reaction conditions.

It is preferred to operate at atmospheric pressure, but elevated or reduced pressure may be employed, if desired.

The temperatures which have been found most satisfactory for our new method lie within the range of 50–150° C., although the reaction may be carried out at considerable higher or lower temperatures.

The product of the invention is of value as an intermediate in the synthesis of other chemical compounds.

The invention is further illustrated, but not limited, by the following typical example.

*Example*

80 mols per hour of gaseous trimethylamine and 80 mols per hour of phosgene are passed through an iron column of 20-cm. diameter and a length of 4 m. The lower end of the column is connected with an iron tank. The two gases are introduced at the upper end of the column tangentially to its cross-section. At the beginning of the reaction the external temperature of the column is kept at 50° C. by heating. Owing to the heat evolved in the reaction the temperature soon rises to 100–160° C. in the upper part of the column. The dimethylcarbamyl chloride formed collects in the tank at the bottom of the column while the effluent gas mainly consisting of methyl chloride flows to two cyclones which can alternately be switched on. In the latter solid reaction products entrained by the gas stream are deposited. After having passed the cyclones the gas flows into a washing apparatus consisting of two trickling towers. In the first tower which is fed with hot water minor quantities of phosgene contained in the off-gas are destroyed, while in the second tower carbonic acid formed by decomposition of the phosgene is washed out with dilute alkali. After passing a drying tower the off-gas thus processed constitutes methyl chloride of high purity.

After 42 hours' duration during which 197 kilograms of trimethylamine and 340 kilograms of phosgene were introduced, 347 kilograms of dimethylcarbamyl chloride boiling at 167° C., 151 kilograms of methyl chloride and 5.8 kilograms of tetramethylammonium chloride are obtained. Hence, the yield based on the trimethylamine is nearly 100 per cent of the theoretical.

When effecting the process with technical phosgene generally containing hydrochloric acid, a small quantity of trimethylamine hydrochloride is obtained along with tetramethylammonium chloride.

Having thus described our invention we claim:
1. A process for preparing dimethyl carbamyl chloride which comprises reacting phosgene and trimethyl amine at elevated temperature in the gaseous phase.
2. The process of claim 1 wherein a temperature within the range of 50–150° C. is employed.
3. The process of claim 2 carried out at atmospheric pressure.
4. The process of claim 3 wherein technical phosgene containing hydrochloric acid is used.

References Cited in the file of this patent

UNITED STATES PATENTS

| Number | Name | Date |
|---|---|---|
| 2,480,088 | Slocombe et al. | Aug. 23, 1949 |

OTHER REFERENCES

Rudenko et al., Chem. Abstracts, vol. 42, column 4918 (1948).